US009156931B2

(12) United States Patent
Kobayashi et al.

(10) Patent No.: US 9,156,931 B2
(45) Date of Patent: *Oct. 13, 2015

(54) RADICAL POLYMERIZABLE COMPOSITION, CURED PRODUCT, AND PLASTIC LENS

(75) Inventors: Nobuo Kobayashi, Ichihara (JP); Akihiro Kondo, Sakura (JP); Atsuhisa Miyawaki, Sakura (JP); Naoya Ikushima, Sakura (JP); Kazuaki Hatsusaka, Kita-Adachi-gun (JP)

(73) Assignee: DIC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/822,076

(22) PCT Filed: Mar. 12, 2012

(86) PCT No.: PCT/JP2012/056260
§ 371 (c)(1),
(2), (4) Date: Jan. 29, 2014

(87) PCT Pub. No.: WO2012/157324
PCT Pub. Date: Nov. 22, 2012

(65) Prior Publication Data
US 2014/0148525 A1       May 29, 2014

(30) Foreign Application Priority Data

May 18, 2011   (JP) .................................. 2011-111319
May 19, 2011   (JP) .................................. 2011-112443

(51) Int. Cl.
*C08F 212/34* (2006.01)
*C08F 220/10* (2006.01)
(Continued)

(52) U.S. Cl.
CPC ............. *C08F 220/36* (2013.01); *C08F 220/18* (2013.01); *G02B 1/04* (2013.01);
(Continued)

(58) Field of Classification Search
CPC .... C08F 212/32; C08F 212/34; C08F 212/04; C08F 220/06; C08F 220/10; C08F 220/68; C08F 283/10; C08F 283/105; C08G 18/04; C08G 71/04
USPC .......... 526/326, 404, 407, 431, 48, 31, 323.2, 526/323.1, 321; 525/404, 407, 48, 31
See application file for complete search history.

(56) References Cited

U.S. PATENT DOCUMENTS 4,625,009 A * 11/1986 Izumitani et al. .......... 526/307.5

FOREIGN PATENT DOCUMENTS

| JP | 2008-094987 A | 4/2008 |
| JP | 2009256246 A * | 11/2009 |
| JP | 4645925 B2 * | 3/2011 |

OTHER PUBLICATIONS

International Search Report dated May 29, 2012, issued for PCT/JP2012/056260.

*Primary Examiner* — Ling Choi
*Assistant Examiner* — David L Miller
(74) *Attorney, Agent, or Firm* — Locke Lord LLP; James E. Armstrong, IV; Nicholas J. DiCeglie, Jr.

(57) ABSTRACT

There are provided a radical polymerizable composition having a low viscosity suitable for coating, a cured product obtained by curing the composition, the cured product having a high refractive index and high toughness and being not easily cracked or chipped when cutting, and a plastic lens obtained by curing the composition. A radical polymerizable composition includes phenylbenzyl(meth)acrylate (A), a urethane(meth)acrylate (X) having an aromatic ring in its molecular structure, and a radical polymerization initiator (Y) as essential components.

13 Claims, 6 Drawing Sheets (51) Int. Cl.
  *C08F 220/36*  (2006.01)
  *G02B 1/04*    (2006.01)
  *C08F 220/18*  (2006.01)
  *C08G 18/04*       (2006.01)
  *C08F 283/10*      (2006.01)
  *C08F 212/32*      (2006.01)
  *C08G 71/04*       (2006.01)
  *C08F 212/04*      (2006.01)
  *C08F 220/68*      (2006.01)
  *C08F 220/06*      (2006.01)

(52) U.S. Cl.
  CPC ............ *C08F 212/04* (2013.01); *C08F 212/32* (2013.01); *C08F 212/34* (2013.01); *C08F 220/06* (2013.01); *C08F 220/10* (2013.01); *C08F 220/68* (2013.01); *C08F 283/10* (2013.01); *C08F 283/105* (2013.01); *C08G 18/04* (2013.01); *C08G 71/04* (2013.01)

RADICAL POLYMERIZABLE COMPOSITION, CURED PRODUCT, AND PLASTIC LENS

TECHNICAL FIELD

The present invention relates to a radical polymerizable composition, a cured product obtained by curing the composition, and a plastic lens obtained by curing the composition.

BACKGROUND ART

Various plastic lenses such as prism lenses are produced by a method in which a resin material is poured into a die, a transparent plastic substrate is placed on the resin material, and the resin material is cured by being heated or by being irradiated with an active energy ray. Therefore, the resin material used to produce plastic lenses needs to have a low viscosity without using a solvent so that the resin material completely fills every cavity of a die and thus has the same shape as that of the die. The resin material also needs to form into a cured product having good physical properties, e.g., optical properties such as a refractive index and transparency, workability such as good releasability from a die, prevention of curling after curing, high flexibility, prevention of cracking and chipping caused by external forces, and good adhesiveness to a transparent plastic substrate.

Among resin materials used for plastic lenses, a compound having a fluorene skeleton has received attention because such a Compound forms into a cured product having a high refractive index. However, the cured product is brittle and has low toughness. When the compound having a fluorene skeleton is used, it is difficult to achieve both toughness and a high refractive index of the cured product. For example, a technology has been known in which the adhesiveness of a cured film to a substrate film, the releasability from a die, solvent resistance, and curling resistance are achieved by using, as a resin composition for plastic lenses, a resin composition including a diacrylate compound having a fluorene skeleton and ortho-phenylphenoxyethyl acrylate (refer to PTL 1). However, since the monoacrylate compound having a fluorene skeleton forms into a brittle cured product as described above, a cured product composed of the resin composition disclosed in PTL 1 has low toughness, and a film composed of the cured product is cracked or chipped when cutting. Furthermore, a compound having a fluorene skeleton generally has a high viscosity. If the resin composition contains such a compound having a fluorene skeleton, only compounds having a relatively low viscosity can be used as other components of the resin composition.

CITATION LIST

Patent Literature

PTL 1: Japanese Unexamined Patent Application Publication No. 2008-94987

SUMMARY OF INVENTION

Technical Problem

Accordingly, it is an object of the present invention to provide a radical polymerizable composition having a low viscosity suitable for coating, a cured product obtained by curing the composition, the cured product having a high refractive index and high toughness and being not easily cracked or chipped when cutting, and a plastic lens obtained by curing the composition.

Solution to Problem

As a result of thorough studies to address the problems above, the inventors of the present invention have found the following and have completed the present invention. That is, a radical polymerizable composition including phenylbenzyl (meth)acrylate (A), a urethane(meth)acrylate (X) having an aromatic ring in its molecular structure, and a radical polymerization initiator (Y) as essential components has a low viscosity suitable for coating without using a solvent and forms into a cured product having a high refractive index.

The present invention relates to a radical polymerizable composition including phenylbenzyl(meth)acrylate (A), a urethane(meth)acrylate (X) having an aromatic ring in its molecular structure, and a radical polymerization initiator (Y) as essential components.

The present invention also relates to a cured product obtained by curing the radical polymerizable composition.

The present invention also relates to a plastic lens obtained by curing the radical polymerizable composition.

Advantageous Effects of Invention

According to the present invention, there can be provided a radical polymerizable composition having a low viscosity suitable for coating without using a solvent, a cured product obtained by curing the adhesive, the cured product having a high refractive index and high toughness and being not easily cracked or chipped when cutting, and a plastic lens obtained by curing the adhesive.

DESCRIPTION OF EMBODIMENTS

A radical polymerizable composition of the present invention includes phenylbenzyl(meth)acrylate (A) as an essential component, and thus a cured product of the radical polymerizable composition has a high refractive index.

The phenylbenzyl(meth)acrylate (A) includes ortho-phenylbenzyl(meth)acrylate, meta-phenylbenzyl(meth)acrylate, and para-phenylbenzyl(meth)acrylate. In the phenylbenzyl (meth)acrylate (A) of the present invention, these compounds may be used alone or in combination of two or more. Among the compounds, ortho-phenylbenzyl(meth)acrylate and meta-phenylbenzyl(meth)acrylate are preferred because they have a relatively high refractive index and a low viscosity. Specifically, the liquid refractive index is 1.57 or more and the viscosity is 30 mPa·s or less at 25° C. Para-phenylbenzyl acrylate is also preferred because it has a considerably high liquid refractive index of 1.59 or more at 40° C. though it is a solid at ordinary temperature.

In particular, ortho-phenylbenzyl(meth)acrylate, meta-phenylbenzyl(meth)acrylate, and para-phenylbenzyl(meth) acrylate are preferably used in a combined manner because both a low viscosity of the composition and a high refractive index of the cured product can be achieved. The mixing ratio is preferably set such that the molar ratio of ortho-phenylbenzyl(meth)acrylate and meta-phenylbenzyl(meth)acrylate to para-phenylbenzyl(meth)acrylate[{[ortho-phenylbenzyl (meth)acrylate]+[meta-phenylbenzyl(meth)acrylate]}/[para-phenylbenzyl(meth)acrylate]] is 55/45 to 10/90. This is because a radical polymerizable composition that has a low viscosity and forms into a cured product having a sufficiently high refractive index is obtained.

Furthermore, since ortho-phenylbenzyl(meth)acrylate and para-phenylbenzyl(meth)acrylate can be produced in a simple process, they are preferably used in a combined manner. The mixing ratio is preferably set such that the molar ratio of ortho-phenylbenzyl(meth)acrylate to para-phenylbenzyl (meth)acrylate [[ortho-phenylbenzyl(meth)acrylate]/[para-phenylbenzyl(meth)acrylate]] is 55/45 to 10/90. This is because a radical polymerizable composition that has a low viscosity and forms into a cured product having a sufficiently high refractive index is obtained.

The phenylbenzyl(meth)acrylate (A) is produced by, for example, a method in which biphenylmethanol and (meth) acrylic acid are esterified or a method in which a halogenated methylbiphenyl such as chloromethylbiphenyl or bromomethylbiphenyl is caused to react with a salt of (meth)acrylic acid and an alkali metal such as potassium, sodium, or lithium.

The radical polymerizable composition of the present invention includes a urethane(meth)acrylate (X) having an aromatic ring in its molecular structure as an essential component in addition to the phenylbenzyl(meth)acrylate (A). The urethane(meth)acrylate (X) is preferably used because a film having good curing properties and high toughness is formed.

The urethane(meth)acrylate (X) has an aromatic ring skeleton in its molecular structure and thus is a compound having a high refractive index. Specifically, the refractive index of the urethane(meth)acrylate (X) is preferably 1.50 or more at 25° C.

Examples of the urethane(meth)acrylate (X) include a urethane(meth)acrylate (X1) obtained by a reaction of a polyisocyanate compound (x1) and a (meth)acrylate compound (x2) having a hydroxyl group in its molecular structure and a urethane(meth)acrylate (X2) obtained by a reaction of a polyisocyanate compound (x3), a (meth)acrylate compound (x4) having a hydroxyl group in its molecular structure, and a polyol compound (x5).

For the purpose of introducing an aromatic ring in the molecular structure of the urethane(meth)acrylate (X1), at least one of the polyisocyanate compound (x1) and the (meth) acrylate compound (x2) having a hydroxyl group in its molecular structure needs to have an aromatic ring skeleton in its molecular structure.

The polyisocyanate compound (x1) used as a raw material of the urethane(meth)acrylate (X) may be, for example, a diisocyanate monomer or a nurate-type polyisocyanate compound having an isocyanurate ring structure in its molecule.

Examples of the diisocyanate monomer include aliphatic diisocyanates such as butane-1,4-diisocyanate, hexamethylene diisocyanate, 2,2,4-trimethylhexamethylene diisocyanate, 2,4,4-trimethylhexamethylene diisocyanate, xylylene diisocyanate, and m-tetramethylxylylene diisocyanate;

alicyclic diisocyanates such as cyclohexane-1,4-diisocyanate, isophorone diisocyanate, lysine diisocyanate, dicyclohexylmethane-4,4'-diisocyanate, 1,3-bis(isocyanatomethyl) cyclohexane, and methylcyclohexane diisocyanate; and aromatic diisocyanates such as 1,5-naphthylene diisocyanate, 4,4'-diphenylmethane diisocyanate, 2,2'-bis(p-phenyl isocyanate)propane, 4,4'-dibenzyl diisocyanate, dialkyldiphenylmethane diisocyanates, tetraalkyldiphenylmethane diisocyanates, 1,3-phenylene diisocyanate, 1,4-phenylene diisocyanate, and tolylene diisocyanate.

Such a nurate-type polyisocyanate compound having an isocyanurate ring structure in its molecule can be prepared by, for example, a reaction between a diisocyanate monomer and a monoalcohol or a diol. Examples of the diisocyanate monomer used in the reaction include various diisocyanate monomers described above and these diisocyanate monomers may be used alone or in combination of two or more. Examples of the monoalcohol used in the reaction include hexanol, octanol, n-decanol, n-undecanol, n-dodecanol, n-tridecanol, n-tetradecanol, n-pentadecanol, n-heptadecanol, n-octadecanol, and n-nonadecanol. Examples of the diol include ethylene glycol, diethylene glycol, propylene glycol, 1,3-propanediol, 1,4-butanediol, 1,3-butanediol, 3-methyl-1,3-butanediol, 1,5-pentanediol, neopentyl glycol, and 1,6-hexanediol. These monoalcohols and diols may each be used alone or in combination of two or more.

Examples of the (meth)acrylate compound (x2) having a hydroxyl group in its molecular structure and used as a raw material of the urethane(meth)acrylate (X1) include aliphatic (meth)acrylate compounds such as 2-hydroxyethyl acrylate, 2-hydroxypropyl acrylate, 4-hydroxybutyl acrylate, glycerin diacrylate, trimethylolpropane diacrylate, pentaerythritol triacrylate, and dipentaerythritol pentaacrylate; and (meth)acrylate compounds having an aromatic ring in its molecular structure, such as 4-hydroxyphenyl acrylate, β-hydroxyphenethyl acrylate, 4-hydroxyphenethyl acrylate, 1-phenyl-2-hydroxyethyl acrylate, 3-hydroxy-4-acetylphenyl acrylate, and 2-hydroxy-3-phenoxypropyl acrylate. The aliphatic(meth)acrylate compounds and the (meth)acrylate compounds having an aromatic ring in its molecular structure may each be used alone or in combination of two or more.

In the urethane(meth)acrylate (X1), a urethane(meth)acrylate obtained by a reaction between the aromatic diisocyanate and the aliphatic(meth)acrylate compound and a urethane (meth)acrylate obtained by a reaction between the aliphatic or alicyclic diisocyanate and the (meth)acrylate compound having an aromatic ring in its molecular structure are preferred because a resin composition that has a low viscosity and forms into a cured product having a high refractive index is obtained. Furthermore, a urethane(meth)acrylate obtained by a reaction between tolylene diisocyanate and an aliphatic (meth)acrylate compound having a (meth)acryloyl group in its molecular structure, such as 2-hydroxyethyl acrylate, 2-hydroxypropyl acrylate, or 4-hydroxybutyl acrylate; and a urethane(meth)acrylate obtained by a reaction between isophorone diisocyanate and 2-hydroxy-3-phenoxypropyl acrylate are particularly preferred because a film having higher toughness is formed.

The urethane(meth)acrylate (X1) is produced by, for example, the following method. The polyisocyanate compound (x1) and the (meth)acrylate compound (x2) having a hydroxyl group in its molecular structure are caused to react with each other in the temperature range of 20° C. to 120° C. optionally using a publicly known urethane-forming catalyst. In this method, the molar ratio [(NCO)/(OH)] of an isocyanate group of the polyisocyanate compound (x1) to a hydroxyl group of the (meth)acrylate compound (x2) having a hydroxyl group in its molecular structure is set to be 1/0.95 to 1/1.05.

For the purpose of introducing an aromatic ring in the molecular structure of the urethane(meth)acrylate (X2), at least one compound of the polyisocyanate compound (x3), the (meth)acrylate compound (x4) having a hydroxyl group in its molecular structure, and the polyol compound (x5) needs to have an aromatic ring skeleton in its molecular structure.

The polyisocyanate compound (x3) used as a raw material of the urethane(meth)acrylate (X2) is obtained by a reaction between a polyol and a diisocyanate monomer or the polyisocyanate compound (x1) listed as a raw material of the urethane(meth)acrylate (X1). An adduct-type polyisocyanate compound having a urethane bond in its molecule is exemplified as the polyisocyanate compound (x3).

Examples of the diisocyanate monomer used as a raw material of the adduct-type polyisocyanate compound include the diisocyanate monomers described above. The diisocyanate monomers may be used alone or in combination of two or more. Examples of the polyol used as a raw material of the adduct-type polyisocyanate compound include ethylene glycol, diethylene glycol, propylene glycol, 1,3-propanediol, 1,4-butanediol, 1,3-butanediol, 3-methyl-1,3-butanediol, 1,5-pentanediol, neopentyl glycol, 1,6-hexanediol, trimethylolethane, trimethylolpropane, and glycerin. These polyols may be used alone or in combination of two or more.

Among the polyisocyanate compounds (x3), various diisocyanate monomers are preferred because a resin composition that has a low viscosity and forms into a cured product having a high refractive index is obtained.

Examples of the (meth)acrylate compound (x4) having a hydroxyl group in its molecular structure and used as a raw material of the urethane(meth)acrylate (X2) include the (meth)acrylate compounds (x2) listed as a raw material of the urethane(meth)acrylate (X1). Among them, aliphatic mono (meth)acrylates such as 2-hydroxyethyl acrylate, 2-hydroxypropyl acrylate, and 4-hydroxybutyl acrylate are preferred because a resin composition that has a low viscosity and forms into a cured product having a high refractive index is obtained.

Examples of the polyol compound (x5) used as a raw material of the urethane(meth)acrylate (X2) include aliphatic polyols such as ethylene glycol, diethylene glycol, propylene glycol, 1,3-propanediol, 1,4-butanediol, 1,3-butanediol, 3-methyl-1,3-butanediol, 1,5-pentanediol, neopentyl glycol, 1,6-hexanediol, trimethylolethane, trimethylolpropane, and glycerin;

aromatic polyols such as hydroquinone, 2-methylhydroquinone, 1,4,-benzenedimethanol, 3,3'-biphenyldiol, 4,4'-biphenyldiol, biphenyl-3,3'-dimethanol, biphenyl-4,4'-dimethanol, bisphenol A, bisphenol B, bisphenol F, bisphenol S, 1,4-naphthalenediol, 1,5-naphthalenediol, 2,6-naphthalenediol, naphthalene-2,6-dimethanol, and 4,4',4"-methylidynetrisphenol;

polyether-modified aliphatic polyols obtained by a ring-opening polymerization of the aliphatic polyol and a cyclic ether compound such as ethylene oxide, propylene oxide, tetrahydrofuran, ethyl glycidyl ether, propyl glycidyl ether, butyl glycidyl ether, phenyl glycidyl ether, or allyl glycidyl ether;

polyether-modified aromatic polyols obtained by a ring-opening polymerization of the aromatic polyol and a cyclic ether compound such as ethylene oxide, propylene oxide, tetrahydrofuran, ethyl glycidyl ether, propyl glycidyl ether, butyl glycidyl ether, phenyl glycidyl ether, or allyl glycidyl ether;

lactone-modified aliphatic polyols obtained by a polycondensation of the aliphatic polyol and a lactone compound such as s-caprolactone;

lactone-modified aromatic polyols obtained by a polycondensation of the aromatic polyol and a lactone compound such as s-caprolactone;

aromatic-ring-containing polyester polyols obtained by a reaction between the aromatic polyol and an aliphatic dicarboxylic acid such as malonic acid, succinic acid, glutaric acid, adipic acid, or pimelic acid; and aromatic-ring-containing polyester polyols obtained by a reaction between the aliphatic polyol and an aromatic dicarboxylic acid such as phthalic acid, phthalic anhydride, terephthalic acid, isophthalic acid, or o-phthalic acid or an anhydride of the foregoing. These polyol compounds may be used alone or in combination of two or more. Among them, bisphenol compounds such as bisphenol A, bisphenol B, bisphenol S, and bisphenol F and a polyether-modified bisphenol compound obtained by a ring-opening polymerization of the bisphenol compound and a cyclic ether compound are preferred because a cured film has a high refractive index and high toughness.

The urethane(meth)acrylate (X2) is produced by, for example, the following method. The polyol compound (x5) and the polyisocyanate compound (x3) are caused to react with each other in the temperature range of 20° C. to 120° C. optionally using a publicly known urethane-forming catalyst to obtain an isocyanate-group-containing intermediate as a reaction product. Herein, the molar ratio [(OH)/(NCO)] of a hydroxyl group of the polyol compound (x5) to an isocyanate group of the polyisocyanate compound (x3) is set to be 1/1.5 to 1/2.5. Subsequently, the intermediate and the (meth)acrylate compound (x4) having a hydroxyl group in its molecular structure are caused to react with each other in the temperature range of 20° C. to 120° C. optionally using a publicly known urethane-forming catalyst. Herein, the molar ratio [(OH)/(NCO)] of a hydroxyl group of the (meth)acrylate compound (x4) having a hydroxyl group in its molecular structure to an isocyanate group of the intermediate is set to be 1/0.95 to 1/1.05.

Alternatively, the urethane(meth)acrylate (X2) is produced by, for example, a method in which the polyol compound (x5), the polyisocyanate compound (x3), and the (meth)acrylate compound (x4) having a hydroxyl group in its molecular structure are charged together and caused to react with one another or a method in which the polyisocyanate compound (x3) and the (meth)acrylate compound (x4) having a hydroxyl group in its molecular structure are caused to react with each other and then the polyol compound (x5) is caused to react therewith.

Among the urethane(meth)acrylates (X), the urethane (meth)acrylate (X2) is preferred because a cured film having a higher refractive index and high toughness is obtained. A urethane(meth)acrylate having a bis(phenylene)alkane skeleton in its molecular structure is further preferred. Such a urethane(meth)acrylate is obtained by a reaction of a diisocyanate, an aliphatic mono(meth)acrylate, and a bisphenol compound and a polyether-modified bisphenol compound.

The weight-average molecular weight (Mw) of the thus-obtained urethane(meth)acrylate (X) is preferably 350 to 5000 and more preferably 400 to 3500 to provide a composition having a lower viscosity and a cured film having high toughness.

In the present invention, the weight-average molecular weight (Mw) is measured by gel permeation chromatography (GPC) under the following conditions.

Measurement instrument; HLC-8220GPC manufactured by Tosoh Corporation

Columns; TSK-GUARDCOLUMN SuperHZ-L manufactured by Tosoh Corporation

+TSK-GEL SuperHZM-M×4, manufactured by Tosoh Corporation

Detector; R1 (differential refractometer)

Data processing; Multistation GPC-8020 model II manufactured by Tosoh Corporation Measurement conditions; Column temperature 40° C.

Solvent tetrahydrofuran

Flow rate 0.35 ml/min

Standard; monodisperse polystyrene

Sample; sample (100 μl) obtained by filtering a tetrahydrofuran solution having a concentration of 0.2 mass % in terms of resin solid matter through a microfilter In the radical polymerizable composition of the present invention, the content of the urethane(meth)acrylate (X) is preferably 50 to 100 parts by mass and more preferably 55 to 85 parts by mass relative to 100 parts by mass of the phenylbenzyl(meth)acrylate (A) to provide a radical polymerizable composition having a low viscosity suitable for coating without using a solvent and a cured product of the composition that has a high refractive index and good flexibility and is not easily cracked or chipped when cutting.

The radical polymerizable composition of the present invention further includes a radical polymerization initiator (Y). Examples of the radical polymerization initiator include 1-hydroxycyclohexyl phenyl ketone, 2-hydroxy-2-methyl-1-phenylpropan-1-one, 1-[4-(2-hydroxyethoxy)phenyl]-2-hydroxy-2-methyl-1-propan-1-one, thioxanthone and thioxanthone derivatives, 2,2'-dimethoxy-1,2-diphenylethan-1-one, 2,4,6-trimethylbenzoyldiphenylphosphine oxide, bis(2,4,6-trimethylbenzoyl)phenylphosphine oxide, 2-methyl-1-[4-(methylthio)phenyl]-2-morpholino-1-propanone, and 2-benzyl-2-dimethylamino-1-(4-morpholinophenyl)-butan-1-one.

Examples of commercially available products of the radical polymerization initiator include "IRGACURE-184", "IRGACURE-149", "IRGACURE-261", "IRGACURE-369", "IRGACURE-500", "IRGACURE-651", "IRGACURE-754", "IRGACURE-784", "IRGACURE-819", "IRGACURE-907", "IRGACURE-1116", "IRGACURE-1664", "IRGACURE-1700", "IRGACURE-1800", "IRGACURE-1850", "IRGACURE-2959", "IRGACURE-4043", and "DAROCUR-1173" that are manufactured by Ciba Specialty Chemicals; "Lucirin TPO" manufactured by BASF; "KAYACURE DETX", "KAYACURE MBP", "KAYACURE DMBI", "KAYACURE EPA", and "KAYACURE OA" that are manufactured by Nippon Kayaku Co., Ltd.; "VICURE 10" and "VICURE 55" that are manufactured by Stauffer Chemical Company; "Trigonal P1" manufactured by Akzo; "Sandoray 1000" manufactured by Sandoz Ltd.; "DEAP" manufactured by Upjohn Co.; and "Quantacure-PDO", "Quantacure-ITX", and "Quantacure-EPD" that are manufactured by Ward Blenkinsop & Company Limited.

The content of the radical polymerization initiator is preferably 0.05 to 20 parts by mass and more preferably 0.1 to 10 parts by mass relative to 100 parts by mass of the radical polymerizable composition of the present invention to achieve good curing properties.

In the case where the radical polymerizable composition of the present invention is cured by photopolymerization, a photosensitizer may be added together with the radical polymerization initiator. Examples of the photosensitizer include amines, ureas, sulfur-containing compounds, phosphorus-containing compounds, chlorine-containing compounds, and nitriles and other nitrogen-containing compounds. These photosensitizers may be used alone or in combination of two or more. The amount of the photosensitizer added is preferably 0.01 to 10 parts by mass relative to 100 parts by mass of the radical polymerizable composition of the present invention.

In addition to the phenylbenzyl(meth)acrylate (A), the urethane(meth)acrylate (X) having an aromatic ring in its molecular structure, and the radical polymerization initiator (Y), the radical polymerizable composition of the present invention preferably further includes the bis[(meth)acryloylmethyl]biphenyl (B) or the biphenyl compound (C) having a molecular structure in which biphenyl structures are bonded to each other through a methylene to provide a resin composition that has a low viscosity and forms into a cured product having a high refractive index. More preferably, the radical polymerizable composition further includes both the bis[(meth)acryloylmethyl]biphenyl (B) and the biphenyl compound (C) having a molecular structure in which biphenyl structures are bonded to each other through a methylene.

Since the bis[(meth)acryloylmethyl]biphenyl (B) used in the present invention has an aromatic ring in its molecular structure, a cured film having a high refractive index can be formed by adding the bis[(meth)acryloylmethyl]biphenyl (B). Since the bis[(meth)acryloylmethyl]biphenyl (B) has two (meth)acryloyl groups in its molecular structure, good curing properties due to radical polymerization are achieved and the toughness of a cured film is improved.

Examples of the bis[(meth)acryloylmethyl]biphenyl (B) include 2,2'-bis(acryloylmethyl)-1,1'-biphenyl, 3,3'-bis(acryloylmethyl)-1,1'-biphenyl, 4,4'-bis(acryloylmethyl)-1,1'-biphenyl, 2,4'-bis(acryloylmethyl)-1,1'-biphenyl, 2,4-bis(acryloylmethyl)-1,1'-biphenyl, and 2,6-bis(acryloylmethyl)-1,1'-biphenyl. They may be used alone or in combination of two or more. Among them, 2,2'-bis(acryloylmethyl)-1,1'-biphenyl, 3,3'-bis(acryloylmethyl)-1,1'-biphenyl, and 4,4'-bis(acryloylmethyl)-1,1'-biphenyl are preferred because of their simple production process, and 4,4'-bis(acryloylmethyl)-1,1'-biphenyl is further preferred.

The bis[(meth)acryloylmethyl]biphenyl (B) is produced by, for example, a method in which biphenyldimethanol and (meth)acrylic acid are esterified or a method in which a bis(halogenated methyl)biphenyl such as bis(chloromethyl)biphenyl or bis(bromomethyl)biphenyl is caused to react with (meth)acrylic acid.

Since the biphenyl compound (C) having a molecular structure in which biphenyl structures are bonded to each other through a methylene according to the present invention has an aromatic ring in its molecular structure, a cured film having a high refractive index can be formed by adding the biphenyl compound (C).

Since the biphenyl compound (C) having a molecular structure in which biphenyl structures are bonded to each other through a methylene has high solubility in other components included in the radical polymerizable composition of the present invention, the number of biphenyl structural units in the molecular structure is preferably 2 to 5.

The biphenyl compound (C) having a molecular structure in which biphenyl structures are bonded to each other through a methylene is produced by, for example, a method in which biphenyl and p-formaldehyde are caused to react with each other in the presence of an acid catalyst.

In the case where the radical polymerizable composition of the present invention includes the bis[(meth)acryloylmethyl]biphenyl (B) or the biphenyl compound (C) having a molecular structure in which biphenyl structures are bonded to each other through a methylene, the content of the urethane(meth) acrylate (X) is preferably 50 to 100 parts by mass and more preferably 55 to 85 parts by mass relative to 100 parts by mass in total of the phenylbenzyl(meth)acrylate (A) and the bis [(meth)acryloylmethyl]biphenyl (B) or the biphenyl compound (C) having a molecular structure in which biphenyl structures are bonded to each other through a methylene, to provide a radical polymerizable composition having a low viscosity suitable for coating without using a solvent and a cured product of the composition that has a high refractive index and high toughness and is not easily cracked or chipped when cutting.

In the present invention, the content of the phenylbenzyl (meth)acrylate (A) is preferably 30 to 95 parts by mass and more preferably 35 to 85 parts by mass relative to 100 parts by mass in total of the phenylbenzyl(meth)acrylate (A), the bis [(meth)acryloylmethyl]biphenyl (B), and the biphenyl compound (C) having a molecular structure in which biphenyl structures are bonded to each other through a methylene, to provide a radical polymerizable composition that forms into a cured product having a high refractive index and high toughness.

In the present invention, the content of the bis[(meth)acryloylmethyl]biphenyl (B) is preferably 5 to 70 parts by mass and more preferably 15 to 65 parts by mass relative to 100 parts by mass in total of the phenylbenzyl(meth)acrylate (A), the bis[(meth)acryloylmethyl]biphenyl (B), and the biphenyl compound (C) having a molecular structure in which biphenyl structures are bonded to each other through a methylene, to provide a radical polymerizable composition that forms into a cured product having a high refractive index.

In the present invention, the content of the biphenyl compound (C) having a molecular structure in which biphenyl structures are bonded to each other through a methylene is preferably 0.5 to 30 parts by mass and more preferably 1 to 25 parts by mass relative to 100 parts by mass in total of the phenylbenzyl(meth)acrylate (A), the bis[(meth)acryloylmethyl]biphenyl (B), and the biphenyl compound (C) having a molecular structure in which biphenyl structures are bonded to each other through a methylene, to provide a radical polymerizable composition that forms into a cured product having a high refractive index.

The radical polymerizable composition of the present invention has a low viscosity and forms into a cured product having a high refractive index and high toughness. To achieve this, the total mass of the phenylbenzyl(meth)acrylate (A), the bis[(meth)acryloylmethyl]biphenyl (B), and the biphenyl compound (C) having a molecular structure in which biphenyl structures are bonded to each other through a methylene is preferably 40 to 75 parts by mass and particularly preferably 45 to 70 parts by mass relative to 100 parts by mass of the non-volatile matter of the radical polymerizable composition.

In the case where the radical polymerizable composition of the present invention includes the phenylbenzyl(meth)acrylate (A), the bis(acryloylmethyl)biphenyl (B), and the biphenyl compound (C) having a molecular structure in which biphenyl structures are bonded to each other through a methylene, these compounds can be simultaneously produced by a single reaction. Such a radical polymerizable composition is, for example, a radical polymerizable composition obtained by causing biphenyl, a hydrogen halide, and a formaldehyde derivative to react with one another to obtain a reaction mixture and then causing the reaction mixture to react with acrylic acid or an alkali metal acrylate.

The radical polymerizable composition may include, as a by-product of the reaction, a compound other than the phenylbenzyl(meth)acrylate (A), the bis[(meth)acryloylmethyl] biphenyl (B), and the biphenyl compound (C) having a molecular structure in which biphenyl structures are bonded to each other through a methylene. In this case, the total mass of the phenylbenzyl(meth)acrylate (A), the bis[(meth)acryloylmethyl]biphenyl (B), and the biphenyl compound (C) having a molecular structure in which biphenyl structures are bonded to each other through a methylene is preferably 50 to 95 parts by mass and more preferably 65 to 80 parts by mass relative to 100 parts by mass of the composition, to provide a radical polymerizable composition having higher hardness and a lower viscosity.

A specific example of the method for simultaneously producing the radical polymerizable composition including the phenylbenzyl(meth)acrylate (A), the bis(acryloylmethyl)biphenyl (B), and the biphenyl compound (C) having a molecular structure in which biphenyl structures are bonded to each other through a methylene by a single reaction is a method in which biphenyl, a hydrogen halide, and a formaldehyde derivative are caused to react with each other in the presence of an acid catalyst to obtain a mixture including the biphenyl compound (C) having a molecular structure in which biphenyl structures are bonded to each other through a methylene, biphenyl, and a methylchloro compound of biphenyl; and then the methylchloro compound of biphenyl included in the mixture is caused to react with acrylic acid or an alkali metal acrylate to obtain a mixture including the phenylbenzyl (meth)acrylate (A) and the bis[(meth)acryloylmethyl]biphenyl (B).

In the case where the phenylbenzyl(meth)acrylate (A), the bis(acryloylmethyl)biphenyl (B), and the biphenyl compound (C) having a molecular structure in which biphenyl structures are bonded to each other through a methylene are produced by the above-described method, the ratio of the phenylbenzyl(meth)acrylate (A), the bis[(meth)acryloylmethyl]biphenyl (B), and the biphenyl compound (C) having a molecular structure in which biphenyl structures are bonded to each other through a methylene can be suitably adjusted by changing the amount of the formaldehyde derivative used in the reaction and the types and amounts of the acid catalyst and organic acid. Specifically, the amount of formaldehyde used is preferably 1 to 25 moles and more preferably 1.5 to 5 moles relative to 1 mole of biphenyl to adjust the ratio in the preferred range described above. Examples of the formaldehyde derivative include formalin, p-formaldehyde, and trioxane. The molar ratio of the hydrogen halide to biphenyl is preferably excessively high, and examples of the hydrogen halide include concentrated hydrochloric acid and hydrogen chloride gas. Examples of the acid catalyst used in the reaction include sulfuric acid, phosphoric acid, polyphosphoric acid, trichloroacetic acid, dichloroacetic acid, monochloroacetic acid, methanesulfonic acid, p-toluenesulfonic acid, and Lewis acid such as zinc chloride. In the reaction, an organic solvent such as dimethoxyethane, dioxane, cyclopentyl methyl ether, or acetic acid may be used. The reaction temperature is preferably 60° C. to 180° C. and more preferably 70° C. to 120° C. The reaction time is preferably 3 to 60 hours and more preferably 15 to 45 hours.

In the case where the phenylbenzyl(meth)acrylate (A), the bis(acryloylmethyl)biphenyl (B), and the biphenyl compound (C) having a molecular structure in which biphenyl structures are bonded to each other through a methylene are produced by the above-described method, biphenyl may remain in the composition as an unreacted raw material. In the present invention, the content of biphenyl is preferably 0.5 to 15 parts by mass and more preferably 1 to 10 parts by mass relative to 100 parts by mass of the non-volatile matter of the radical polymerizable composition because a high refractive index is achieved and a composition having a low viscosity is obtained, the high refractive index and low viscosity being desired effects of the present invention.

The ratio of the components included in the radical polymerizable composition obtained by the above-described method is measured by, for example, capillary gas chromatography, liquid chromatography, or gel permeation chromatography. Specifically, a temperature-programmed analysis is performed from 50° C. to 325° C. using a capillary column such as "HP-1" (liquid phase: 100% dimethylpolysiloxane) manufactured by Agilent Technologies. The degree of polymerization of the biphenyl compound (C) included in the product is determined by a method in which components other than the phenylbenzyl(meth)acrylate (A) and the bis(acryloylmethyl)biphenyl (B), which are removed by silica gel column chromatography, are analyzed using a gas chromatography-mass spectrometer (GC-MS) or a high-performance liquid chromatography-mass spectrometer (LC-MS).

In addition to the phenylbenzyl(meth)acrylate (A), the urethane(meth)acrylate (X) having an aromatic ring in its molecular structure, and the radical polymerization initiator (Y), the radical polymerizable composition of the present invention may further include, in a combined manner, a (meth)acrylate compound (Z) other than the phenylbenzyl (meth)acrylate (A) and the bis[(meth)acryloylmethyl]biphenyl (B).

Examples of the (meth)acrylate compound (Z) include monofunctional (meth)acrylate compounds such as n-butyl (meth)acrylate, isobutyl(meth)acrylate, tert-butyl(meth) acrylate, n-pentyl(meth)acrylate, n-hexyl(meth)acrylate, n-octyl(meth)acrylate, isooctyl(meth)acrylate, 2-ethylhexyl (meth)acrylate, benzyl(meth)acrylate, phenoxyethyl(meth) acrylate, phenoxydiethylene glycol(meth)acrylate, glycidyl (meth)acrylate, morpholine(meth)acrylate, 2-hydroxyethyl (meth)acrylate, 2-hydroxypropyl(meth)acrylate, 4-hydroxybutyl(meth)acrylate, diethylene glycol mono (meth)acrylate, triethylene glycol mono(meth)acrylate, dipropylene glycol mono(meth)acrylate, 2-methoxyethyl (meth)acrylate, methoxydiethylene glycol(meth)acrylate, methoxytriethylene glycol(meth)acrylate, methoxypolyethylene glycol(meth)acrylate, 2-butoxyethyl(meth)acrylate, butoxytriethylene glycol(meth)acrylate, 2-ethoxyethyl (meth)acrylate, 2-(2-ethoxyethoxy)ethyl(meth)acrylate, ethoxypolyethylene glycol(meth)acrylate, 4-nonylphenoxyethylene glycol(meth)acrylate, tetrahydrofurfuryl(meth) acrylate, caprolactone-modified tetrahydrofurfuryl(meth) acrylate, cyclohexyl(meth)acrylate, isobornyl(meth)acrylate, 2-hydroxy-3-phenoxypropyl(meth)acrylate, cyclohexyl (meth)acrylate, cyclohexylmethyl(meth)acrylate, cyclohexylethyl(meth)acrylate, dicyclopentanyl(meth)acrylate, dicyclopentanyloxyethyl(meth)acrylate, dicyclopentenyl(meth) acrylate, dicyclopentenyloxyethyl(meth)acrylate, and phenylphenoxyethyl acrylate;

di(meth)acrylate compounds such as ethylene glycol di(meth)acrylate, diethylene glycol di(meth)acrylate, triethylene glycol di(meth)acrylate, polyethylene glycol di(meth) acrylate, propylene glycol di(meth)acrylate, dipropylene glycol di(meth)acrylate, tripropylene glycol di(meth)acrylate, butylene glycol di(meth)acrylate, tetrabutylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, di(meth)acrylate of an ethylene oxide adduct of bisphenol A, di(meth)acrylate of a propylene oxide adduct of bisphenol A, di(meth)acrylate of an ethylene oxide adduct of bisphenol F, di(meth)acrylate of a propylene oxide adduct of bisphenol F, dicyclopentanyl di(meth)acrylate, glycerol di(meth)acrylate, neopentyl glycol hydroxypivalic acid ester di(meth)acrylate, caprolactone-modified hydroxypivalic acid neopentyl glycol di(meth)acrylate, tetrabromobisphenol A di(meth)acrylate, hydroxypivalaldehyde-modified trimethylolpropane di(meth)acrylate, and 1,4-cyclohexanedimethanol di(meth) acrylate; and trifunctional or higher functional(meth)acrylate compounds such as trimethylolpropane tri(meth)acrylate, tri (meth)acrylate of an ethylene oxide adduct of trimethylolpropane, tri(meth)acrylate of a propylene oxide adduct of trimethylolpropane, pentaerythritol tri(meth)acrylate, glycerol tri(meth)acrylate, tri(meth)acrylate of an alkyl modified-dipentaerythritol, ditrimethylolpropane tetra(meth)acrylate, tetra(meth)acrylate of an ethylene oxide adduct of ditrimethylolpropane, tetra(meth)acrylate of a propylene oxide adduct of ditrimethylolpropane, penta(meth)acrylate of dipentaerythritol, and hexa(meth)acrylate of dipentaerythritol. These compounds may be used alone or in combination of two or more.

Among them, benzyl(meth)acrylate, phenoxyethyl(meth) acrylate, phenylphenoxyethyl acrylate, di(meth)acrylate of an ethylene oxide adduct of bisphenol A, and di(meth)acrylate of a propylene oxide adduct of bisphenol A are preferred because a radical polymerizable composition having a higher refractive index is obtained.

In the case where the radical polymerizable composition of the present invention includes the (meth)acrylate compound (Z), the total mass of the phenylbenzyl(meth)acrylate (A), the bis[(meth)acryloylmethyl]biphenyl (B), and the biphenyl compound (C) having a molecular structure in which biphenyl structures are bonded to each other through a methylene is preferably 40 to 75 parts by mass and more preferably 45 to 70 parts by mass relative to 100 parts by mass of the nonvolatile matter of the radical polymerizable composition because a high refractive index is achieved and a composition having a low viscosity is obtained, the high refractive index and low viscosity being desired effects of the present invention.

The radical polymerizable composition of the present invention may optionally include other additives. Examples of the other additives include an ultraviolet absorber, an antioxidant, a silicone-based additive, a fluorine-based additive, a rheology-controlling agent, a defoaming agent, an antistatic agent, and an antifogging agent. The amount of the additive added is preferably 0.01 to 40 parts by mass relative to 100 parts by mass of the radical polymerizable composition of the present invention. Within the range, the effects of the additives are sufficiently produced and ultraviolet curing is not prevented.

The viscosity of the radical polymerizable composition of the present invention is preferably 6000 mPa·s or less because the active-energy-ray-curable resin composition needs to completely fills every cavity of a die without defects even under high-speed-coating conditions.

The radical polymerizable composition of the present invention may be cured by an irradiation process with an active energy ray or a heating process.

In the case where the radical polymerizable composition is cured by irradiation with an active energy ray, the active energy ray may be, for example, an electron beam, an ultraviolet ray, or visible light. When an electron beam is used as the active energy ray, the curable composition of the present invention can be cured using a Cockcroft-Walton accelerator, a Van de Graaff electron accelerator, a resonant transformer accelerator, and an electron beam generator of an insulated core transformer type, Dynamitron type, a linear filament type, or a high frequency type. When an ultraviolet ray is used as the active energy ray, the irradiation is performed using a mercury lamp such as an ultrahigh-pressure mercury lamp, a high-pressure mercury lamp, or a low-pressure mercury lamp, a xenon lamp, carbon arc, or a metal height lamp to cure the curable composition. The exposure with the ultraviolet ray is preferably 0.1 to 1000 mJ/cm$^2$.

In the case where the radical polymerizable composition is cured by heating, the radical polymerizable composition can be cured by performing heating to the temperature range of 60° C. to 250° C.

A cured product of the radical polymerizable composition of the present invention has a high refractive index and good flexibility and is not easily cracked or chipped when cutting. In consideration of such characteristics, the cured product can be suitably used for plastic lenses such as lenses for glasses, a lens for digital cameras, a Fresnel lens, and a prism lens; and various optical materials such as an optical over-coating agent, a hard coating agent, an antireflection film, an optical fiber, an optical waveguide, a hologram, a prism lens, an LED sealing material, and a coating material for solar cells. Among them, the cured product is particularly suitable for plastic lenses such as a prism lens for liquid crystal substrates.

The prism lens for liquid crystal substrates is a sheet-shaped lens that includes a plurality of minute prismatic portions on one surface of a sheet-shaped molded body. The prism lens for liquid crystal substrates is normally disposed on a back surface (light source side) of a liquid crystal display device so that the prism plane faces the liquid crystal display device. Furthermore, a light-guiding sheet is disposed on the back surface of the sheet-shaped lens. In another case, the prism lens for liquid crystal substrates is a sheet-shaped lens in which the prism lens also functions as the light-guiding sheet.

Regarding the shape of the prismatic portions of the prism lens, the prism apex angle θ is preferably 70° to 110°, more preferably 75° to 100°, and particularly preferably 80° to 95° because a good light-condensing property is achieved and the luminance is improved.

The pitch of the prismatic portions is preferably 100 μm or less and particularly preferably 70 μm or less to prevent the formation of a moiré pattern on a screen and to further improve the definition of the screen. The difference between the depressions and projections of the prismatic portions is determined depending on the prism apex angle θ and the pitch of the prismatic portions, and is preferably 50 μm or less. The sheet thickness of the prism lens is preferably as large as possible from the viewpoint of strength, but is preferably as small as possible from the optical viewpoint to suppress the absorption of light. To achieve a good balance, the sheet thickness is preferably 50 to 1000 μm.

The prism lens is produced using the radical polymerizable composition of the present invention by, for example, the following method. The composition is applied to a forming die such as a metal die or resin die having a prism pattern formed therein. The surface of the composition is smoothed and then a transparent substrate is placed thereon. The composition is cured by being irradiated with an active energy ray from the transparent substrate side.

The transparent substrate may be a glass substrate or a plastic substrate composed of acrylic resin, polycarbonate resin, polyester resin, polystyrene resin, fluorocarbon resin, or polyimide resin.

The prism sheet produced by the above-described method may be directly used or may be used as a prism lens alone by removing the transparent substrate. When the prism sheet is used while the prismatic portions are formed on the transparent substrate, an adhesiveness-improving treatment such as a primer treatment is preferably performed on the surface of the transparent substrate to improve the adhesiveness between the prism lens and the transparent substrate.

When the prism sheet is used after the transparent substrate is removed, a treatment with a silicone or fluorine-based release agent is preferably performed on the surface of the transparent substrate to easily remove the transparent substrate.

In the case where the radical polymerizable composition of the present invention is used as an optical material for the prism lens or the like, the refractive index of a cured product of the radical polymerizable composition is preferably 1.5500 or more and more preferably 1.5700 or more.

EXAMPLES

The present invention will now be specifically described based on Examples and Comparative Examples.

In the present invention, the weight-average molecular weight (Mw) was measured by gel permeation chromatography (GPC) under the following conditions.

Measurement instrument; HLC-8220GPC manufactured by Tosoh Corporation

Columns; TSK-GUARDCOLUMN SuperHZ-L manufactured by Tosoh Corporation

+TSK-GEL SuperHZM-M×4, manufactured by Tosoh Corporation

Detector; RI (differential refractometer)

Data processing; Multistation GPC-8020 model II manufactured by Tosoh Corporation Measurement conditions; Column temperature 40° C.

Solvent tetrahydrofuran

Flow rate 0.35 ml/min

Standard; monodisperse polystyrene

Sample; sample (100 μl) obtained by filtering a tetrahydrofuran solution having a concentration of 0.2 mass % in terms of resin solid matter through a microfilter In the present invention, the viscosity was measured at 25° C. with an E-type rotational viscometer ("RE80U" manufactured by Toki Sangyo Co., Ltd.).

In the present invention, the refractive index was measured with an Abbe refractometer ("NAR-3T" manufactured by ATAGO CO., LTD.). The measurement was normally performed at 25° C. If the object is solid at 25° C., the measurement was performed at an appropriate temperature.

In the present invention, the measurement of $^1$H-NMR was performed with NMR "GSX270" manufactured by JEOL Ltd. at 300 MHz using a deuterochloroform solvent.

In the present invention, the gas chromatography-mass spectrum was measured with a gas chromatography-mass spectrometer (GC-MS) ("GC-2010" manufactured by SHIMADZU CORPORATION, column: "Zebron ZB-5" manufactured by SHIMADZU CORPORATION) under the following conditions: He carrier gas, flow rate 1.47 mL/min, column oven 50° C., vaporizing chamber 300° C., and temperature rise 50° C. to 300° C. (25° C./min).

In the present invention, high-performance liquid chromatography (LC) was performed with a high-performance liquid chromatograph ("2695" manufactured by Waters, column: "L-Column2 ODS" manufactured by Chemical Evaluation and Research Institute) under the following conditions: detection UV 240 nm, temperature 40° C., flow rate 1 mL/min, and acetonitrile/water=70/30 to 100/0.

In the present invention, gas chromatography (GC) was performed with a gas chromatograph ("6850 Series" manufactured by Agilent Technologies, column: "Agilent DB-1" manufactured by Agilent Technologies) under the following conditions: He carrier gas, flow rate 1 mL/min, injection temperature 300° C., detection temperature 300° C., and temperature rise 50° C. to 325° C. (25° C./min).

Production Example 1

Synthesis of ortho-phenylbenzyl acrylate

Figure 1:
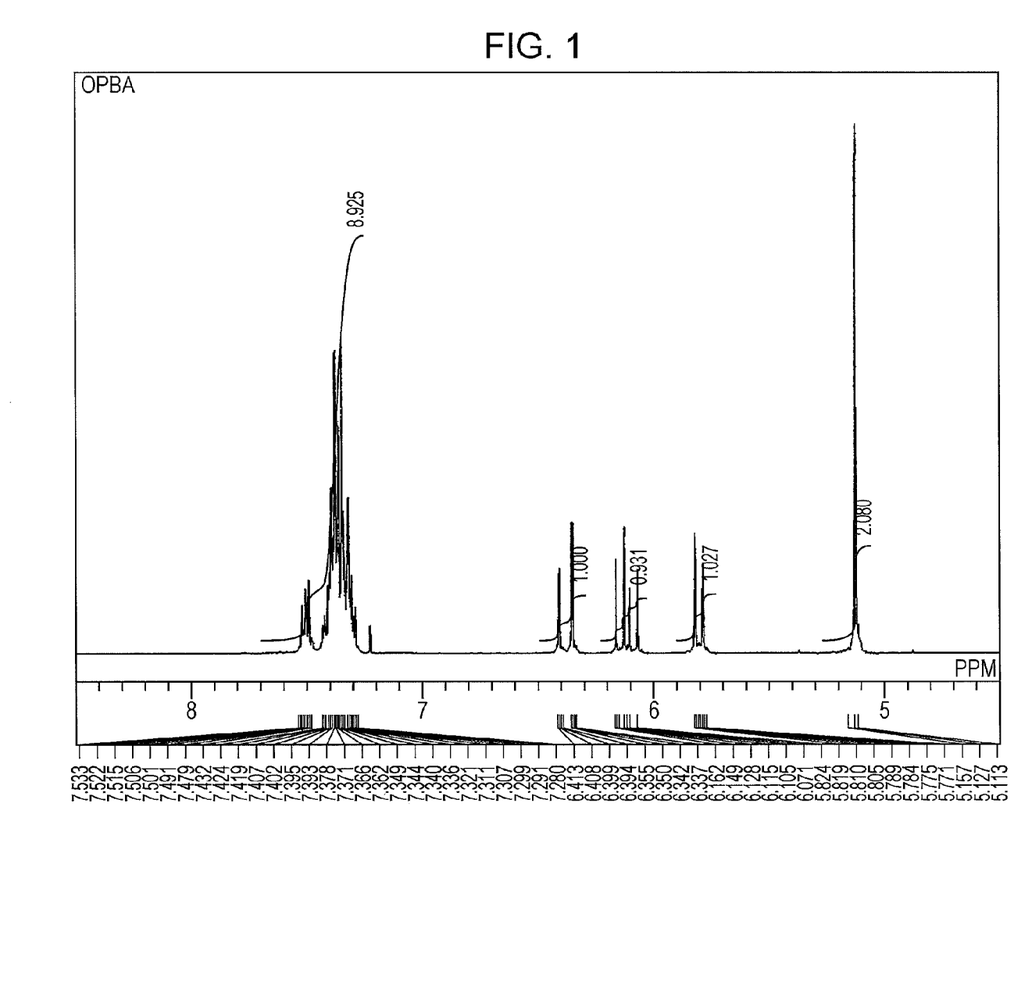
FIG. 1 is a $^1$H-NMR spectrum of ortho-phenylbenzyl acrylate obtained in Production Example 1.

Into a 200 mL three-neck flask equipped with a stirrer, a thermometer, a cooling tube, and a calcium chloride tube, 20.0 g of ortho-phenylbenzyl alcohol, 100.0 g of anhydrous toluene, 13.2 g of triethylamine, and 7.8 mg of methoquinone were charged and cooled to 10° C. or less using an ice bath. Into the flask, 11.8 g of acryloyl chloride wad dropped for 30 minutes. The temperature was increased to room temperature and a reaction was caused to proceed for two hours. After the reaction, the reaction solution was poured into water and washed with a 5% NaOH aqueous solution and a saline solution, and the solvent was distilled off to obtain an orange liquid. The orange liquid was purified with a silica gel column to obtain 20.44 g of ortho-phenylbenzyl acrylate. The obtained ortho-phenylbenzyl acrylate was a colorless, transparent liquid at ordinary temperature and had a refractive index of 1.5776 and a viscosity of 27 mPa·s at 25° C. The measurement result of $^1$H-NMR is shown below.

$^1$H-NMR (CDCl$_3$, 300 MHz): 7.53-7.49 (m, 1H of Ph), 7.48-7.28 (m, 8H of Ph), 6.41-6.34 (q, 1H of CH=CH), 6.34-6.07 (q, 1H of CH=CH), 5.82-5.77 (q, 1H of CH=CH), 5.13 (s, 2H of CH$_2$-Ph).

Production Example 2

Synthesis of meta-phenylbenzyl acrylate

Figure 2:
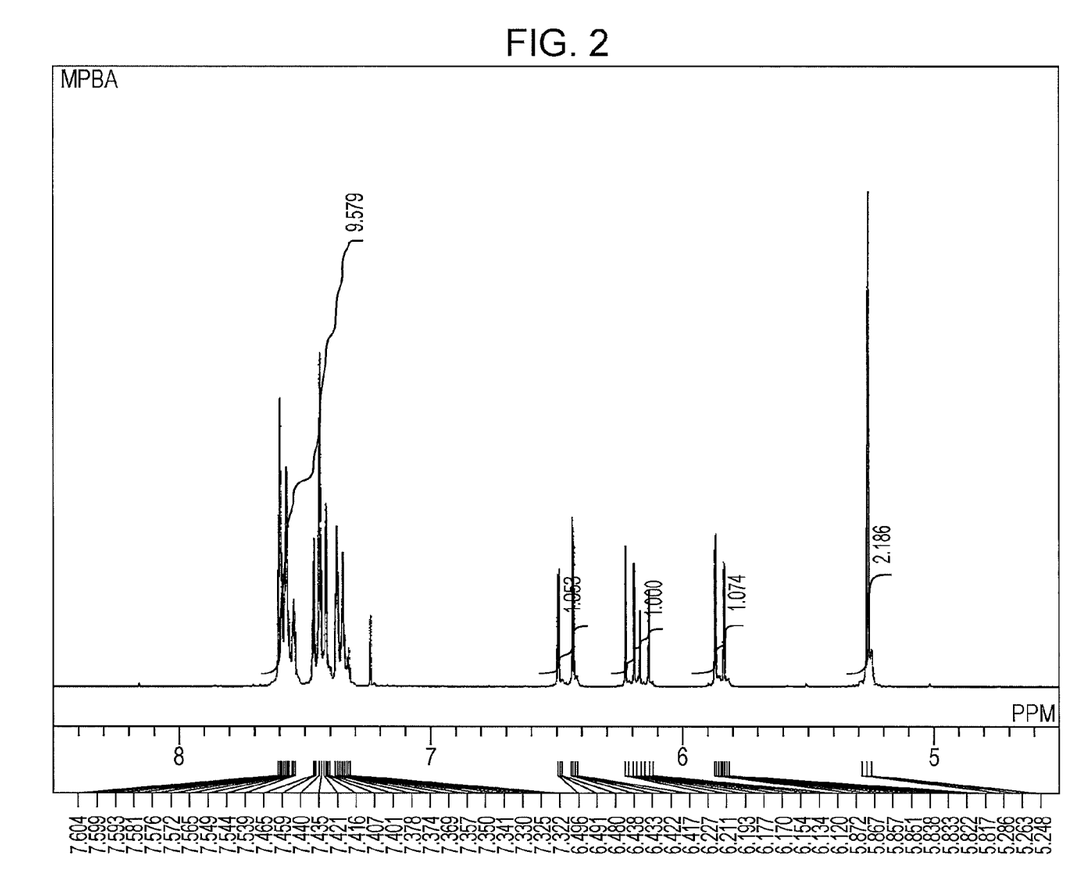
FIG. 2 is $^1$H-NMR of meta-phenylbenzyl acrylate obtained in Production Example 2.

Into a 200 mL four-neck flask equipped with a stirrer, a thermometer, and a cooling tube, 20.0 g of 3-(bromomethyl)biphenyl, 39.3 g of anhydrous dimethylformamide, 13.4 g of anhydrous potassium carbonate, and 6.2 mg of methoquinone were charged, and acrylic acid was added thereto at room temperature. After the completion of foaming of carbon dioxide, the mixture was heated to a reaction temperature of 90° C. and a reaction was caused to proceed for two hours. The temperature was decreased to room temperature, and then dilution with 120 mL of water, extraction with 100 g of toluene, and washing with water were performed. The resultant crude reaction product was purified with a silica gel column to obtain 16.1 g of meta-phenylbenzyl acrylate. The obtained meta-phenylbenzyl acrylate was a colorless, transparent liquid at ordinary temperature and had a refractive index of 1.5888 and a viscosity of 24 mPa·s at 25° C. The measurement result of $^1$H-NMR is shown below.

$^1$H-NMR (CDCl$_3$, 300 MHz): 7.60-7.32 (m, 9H of Ph), 6.50-6.42 (q, 1H of CH=CH), 6.22-6.12 (q, 1H of CH=CH), 5.87-5.82 (q, 1H of CH=CH), 5.26 (s, 2H of CH$_2$-Ph).

Production Example 3

Synthesis of para-phenylbenzyl acrylate

Figure 3:
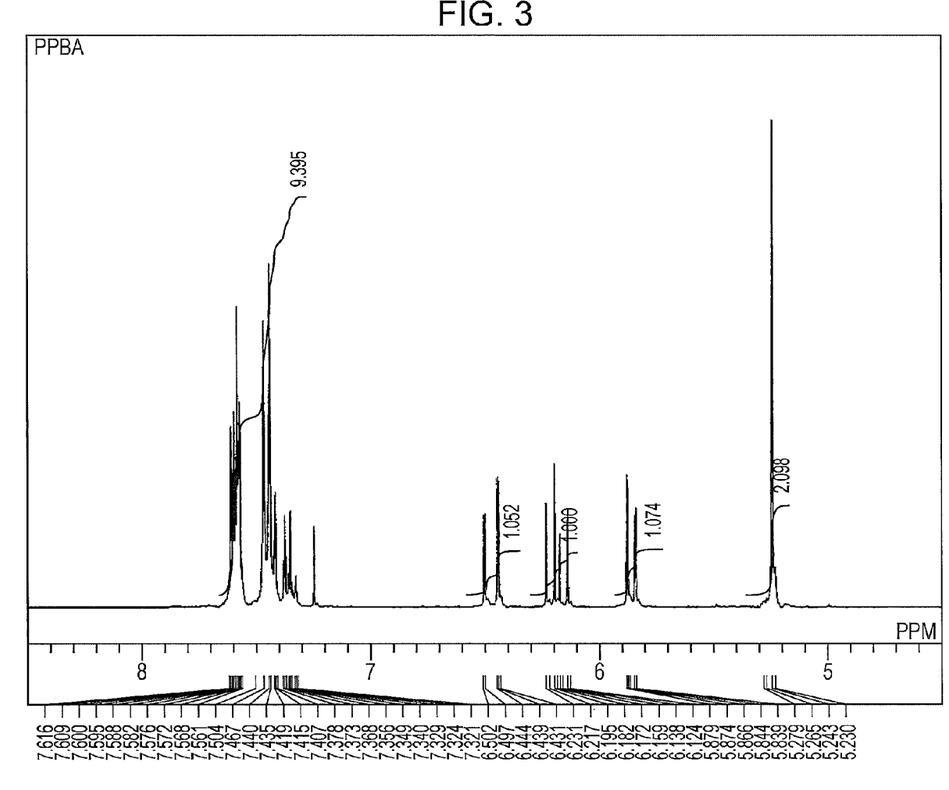
FIG. 3 is $^1$H-NMR of para-phenylbenzyl acrylate obtained in Production Example 3.

The same process as in Synthetic Example 1 was conducted except that the ortho-phenylbenzyl alcohol in Synthetic Example 1 was changed to para-phenylbenzyl alcohol. Consequently, 22.4 g of para-phenylbenzyl acrylate was obtained. The obtained para-phenylbenzyl acrylate was solid at ordinary temperature and had a melting point of 32° C. and a refractive index of 1.5920 at 40° C. The measurement result of $^1$H-NMR is shown below.

$^1$H-NMR (CDCl$_3$, 300 MHz): 7.62-7.32 (m, 9H of Ph), 6.50-6.43 (q, 1H of CH=CH), 6.23-6.12 (q, 1H of CH=CH), 5.88-5.84 (q, 1H of CH=CH), 5.27 (s, 2H of CH$_2$-Ph).

Production Example 4

Synthesis of 4,4'-bis(acryloylmethyl)biphenyl

Figure 4:
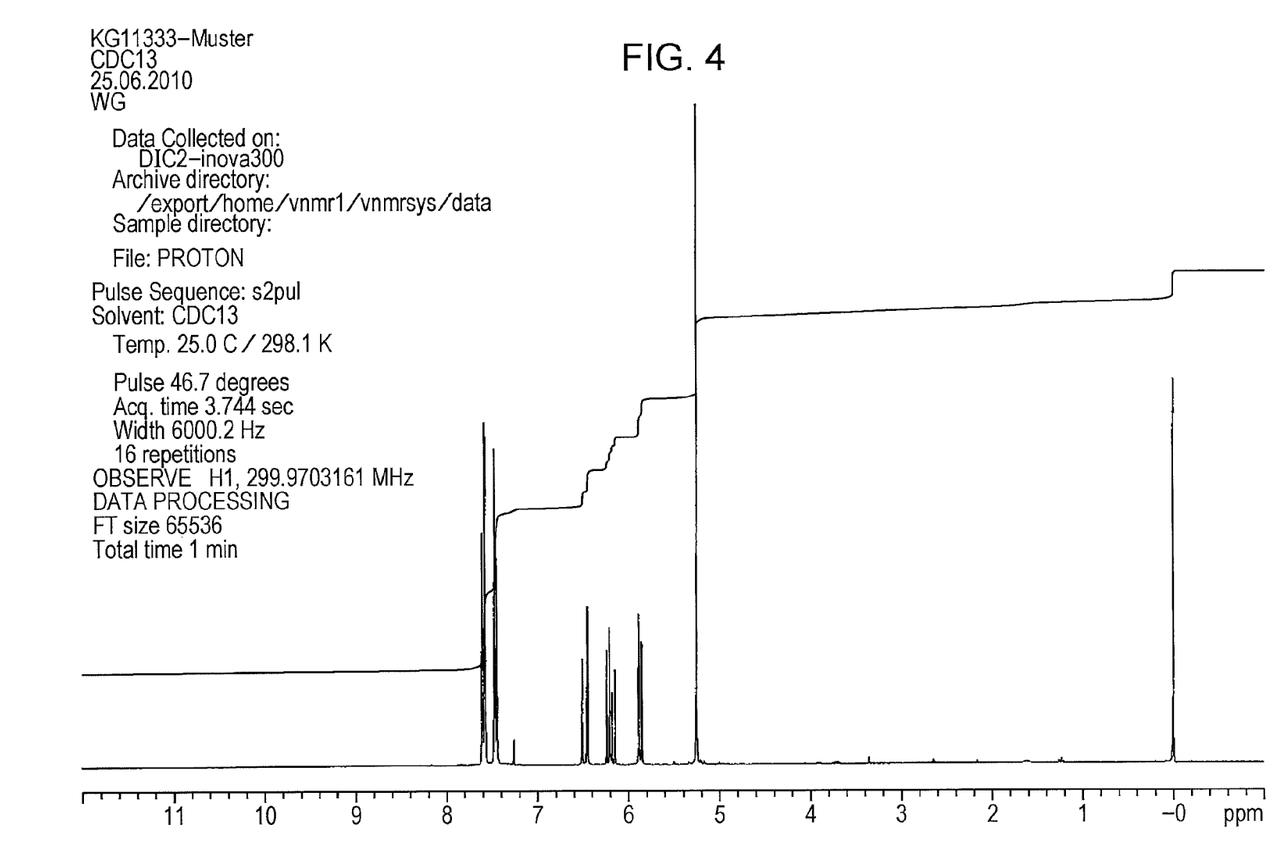
FIG. 4 is $^1$H-NMR of 4,4'-bis(acryloylmethyl)biphenyl obtained in Production Example 4.
Figure 5:
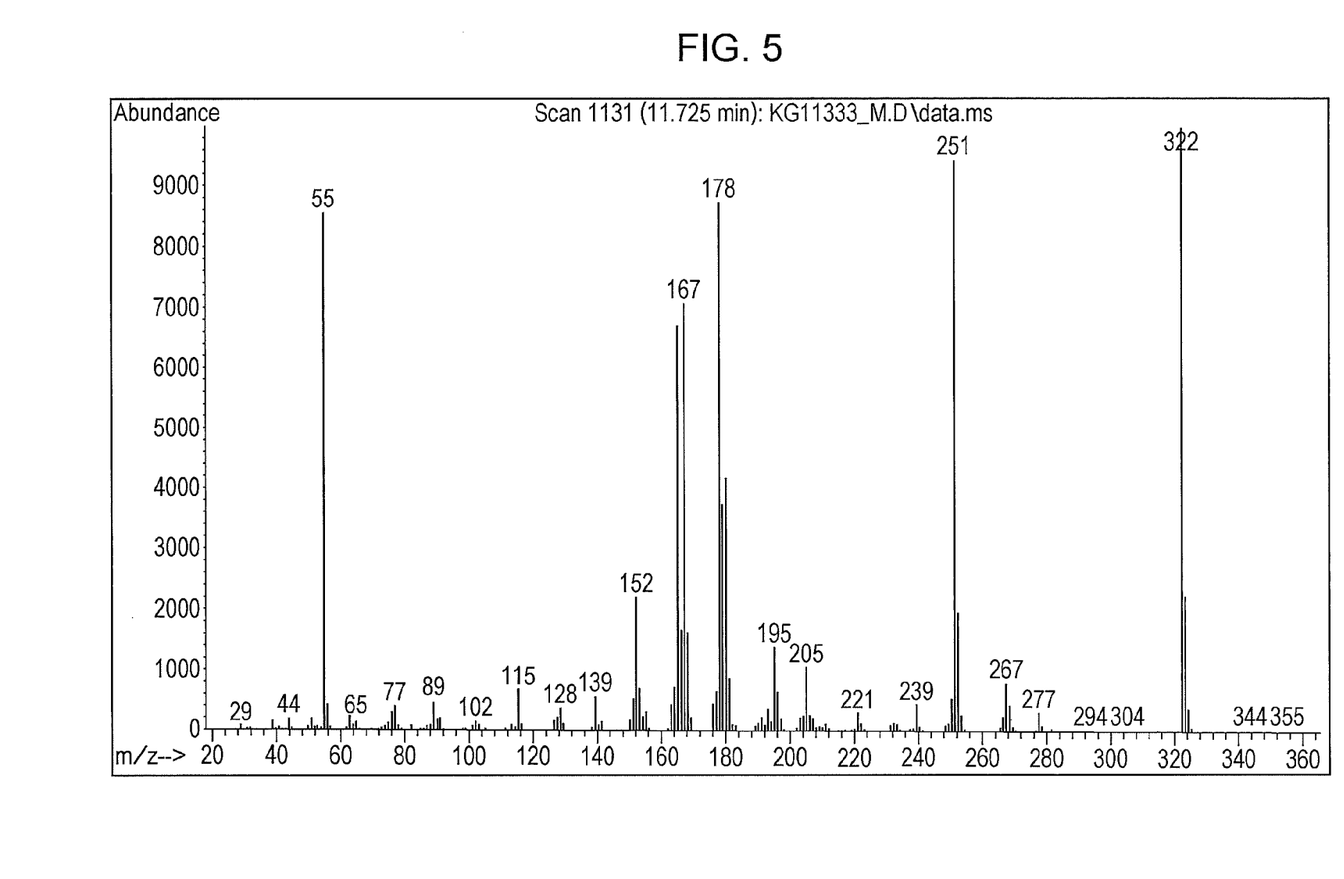
FIG. 5 is a mass spectrum of 4,4'-bis(acryloylmethyl)biphenyl obtained in Production Example 4.

Into a 200 mL four-neck flask equipped with a stirrer, a thermometer, and a cooling tube, 18.0 g of 4,4'-chloromethylbiphenyl, 100 mL of anhydrous dimethylformamide, 25.0 g of anhydrous potassium carbonate, and 100 mg of methoquinone were charged. The mixture was heated to a reaction temperature of 120° C. while being bubbled with air and a reaction was caused to proceed for 15 minutes. After the temperature was decreased to 50° C., the reaction liquid was poured into 300 mL of distilled water. The precipitated crystal was filtered and dried. Then, recrystallization was performed using 80 mL of ethanol to obtain 14.5 g of 4,4'-bis(acryloylmethyl)biphenyl. The obtained 4,4'-bis(acryloylmethyl)biphenyl was a crystal having a melting point of 61° C. to 62° C. and had a refractive index of 1.5648 at 70° C. The measurement results of $^1$H-NMR and mass spectrometry are shown below.

$^1$H-NMR (CDCl$_3$, 300 MHz): 7.67-7.46 (m, 4H of Ph), 7.44-7.28 (m, 4H of Ph), 6.50-6.43 (q, 2H of CH=CH), 6.23-6.12 (q, 2H of CH=CH), 5.88-5.84 (q, 2H of CH=CH), 5.27 (s, 4H of CH$_2$-Ph).

GC-MS: [M+H]$^+$=323

Production Example 5

Synthesis of biphenyl compound

Into a 5 L four-neck flask equipped with a stirrer, a cooling tube, and a thermometer, 709 g of diphenyl, 276 g of para-formaldehyde, 1381 g of acetic acid, 958 g of concentrated hydrochloric acid, and 117 g of iron trichloride were charged, and the temperature was increased to 80° C. After it was confirmed that the charged solution had a temperature of 80° C., a reaction was caused to proceed for 15 hours. During the reaction, a solid was precipitated. After the completion of the reaction, the reaction liquid was filtered at 60° C. to collect the precipitated solid. The solid was washed with 500 mL of methanol and dried to obtain 90 g of a biphenyl compound in the form of a solid. As a result of measurement by liquid chromatography, it was confirmed that the obtained biphenyl compound included biphenyl compounds in which the number of biphenyl structural units in a molecular structure was 2, 3, and 4. The contents of the biphenyl compounds are as follows. Biphenyl compound (two structural units): 99.24% (retention time: 15.73 to 17.08 min), Biphenyl compound (three structural units): 0.54% (retention time: 19.93 to 20.55 min), Biphenyl compound (four structural units): 0.22% (retention time: 21.99 to 22.23 min)

Production Example 6

Production of mixture (1) of phenylbenzyl methacrylate (A), bis(acryloylmethyl)biphenyl (B), biphenyl, and biphenyl compound (C) having a molecular structure in which biphenyl structures are bonded to each other through a methylene Synthesis of Chloro Intermediate
Into a 5 L four-neck flask equipped with a stirrer, a cooling tube, a thermometer, and a hydrogen chloride gas inlet unit, 709 g of diphenyl, 276 g of para-formaldehyde, 1381 g of acetic acid, and 958 g of concentrated hydrochloric acid were charged, and the temperature was increased to 80° C. After it was confirmed that the charged solution had a temperature of 80° C., hydrogen chloride gas was introduced into the charged solution at 20 g/hour through a Kinoshita glass ball filter (fritted gas dispersion tube). It was confirmed that the dissolution of the hydrogen chloride gas in the charged solution was saturated, and then 1061 g of phosphoric acid was dropped into the charged solution for one hour and a reaction was caused to proceed for 30 hours. Immediately after the completion of the reaction, a lower layer was removed from the reaction solution, and 2.3 kg of toluene was added to an organic layer and the organic layer was washed with a 12.5% aqueous sodium hydroxide solution, a saturated aqueous sodium hydrogen carbonate solution, and distilled water. The organic layer was distilled off to obtain 908 g of a chloro intermediate in the form of a white solid.

Acryloylation

Nine hundred and eight grams of the obtained intermediate was dissolved in 1603 g of DMF serving as a reaction solvent, and 372 g of potassium carbonate was added thereto and methoquinone was added thereto in a concentration of 300 ppm relative to the total amount. The intermediate solution was heated to 40° C., and then 323 g of acrylic acid was dropped into the intermediate solution for 1.5 hours. After the completion of the drop, the intermediate solution was heated to 80° C. for two hours and stirred under heating at 80° C. for three hours. Subsequently, 3.4 kg of water and 1.8 kg of toluene were added to the obtained solution and extraction was performed. An organic layer was washed until an aqueous layer was neutralized. The organic layer was concentrated to obtain 995 g of a liquid sample. The sample was stored at 0° C. for two days, and consequently the precipitation of a crystal was not observed.

Analysis of Sample

Figure 6:
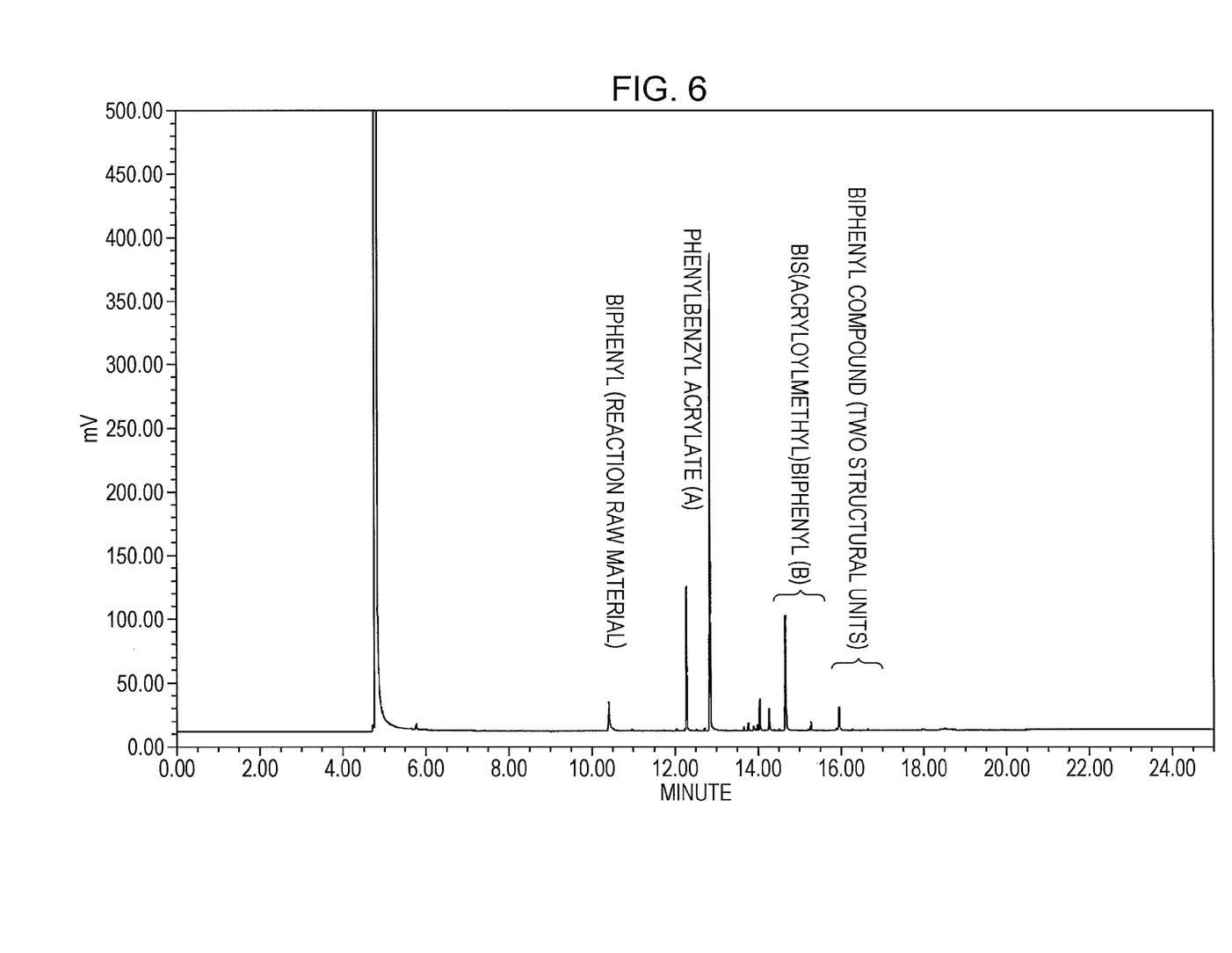
FIG. 6 is a gas chromatograph of a mixture (1) obtained in Production Example 6.

The obtained sample had a liquid refractive index of 1.592 and a viscosity of 30 mPa·s at 25° C. The content of each component included in 100 parts by mass of the sample was measured with a gas chromatograph. The sample included 65.2 parts by mass of phenylbenzyl acrylate (A), 18.6 parts by mass of bis(acryloylmethyl)biphenyl (B), 2.3 parts by mass of a biphenyl compound (C) having a molecular structure in which biphenyl structures are bonded to each other through a methylene, 5.8 parts by mass of biphenyl, and 8.1 parts by mass of unreacted raw materials other than biphenyl. The mass ratio (molar ratio) of isomers of the phenylbenzyl acrylate (A) was 20/1/79.

Production Example 7

Production of urethane(meth)acrylate (X-1)

Into a 1 L flask equipped with a stirrer, a gas inlet tube, a condenser, and a thermometer, 174 parts by mass of tolylene diisocyanate, 1.02 parts by mass of t-butylhydroxytoluene, 0.15 parts by mass of methoxyhydroquinone, and 0.05 parts by mass of dibutyltin diacetate were inserted. The temperature was increased to 80° C., and 162.6 parts by mass of 2-mol ethylene oxide adduct of bisphenol A was separately added for one hour. After the addition of the whole amount, a reaction was caused to proceed at 80° C. for three hours. Subsequently, 118.3 parts by mass of 2-hydroxyethyl acrylate was added and a reaction was further caused to proceed at 80° C. until an infrared absorption spectrum at 2250 cm$^{-1}$, which indicates an isocyanate group, was eliminated. Thus, a urethane acrylate (X-1) having a refractive index of 1.582 and a weight-average molecular weight (Mw) of 3000 was obtained.

Production Example 8

Production of urethane(meth)acrylate (X-2)

Into a 1 L flask equipped with a stirrer, a gas inlet tube, a condenser, and a thermometer, 222 parts by mass of isophorone diisocyanate, 1.02 parts by mass of t-butylhydroxytoluene, 0.15 parts by mass of methoxyhydroquinone, and 0.05 parts by mass of dibutyltin diacetate were inserted. The temperature was increased to 80° C., and 162.6 parts by mass of 2-mol ethylene oxide adduct of bisphenol A was separately added for one hour. After the addition of the whole amount, a reaction was caused to proceed at 80° C. for three hours. Subsequently, 118.3 parts by mass of 2-hydroxyethyl acrylate was added and a reaction was further caused to proceed at 80° C. until an infrared absorption spectrum at 2250 cm$^{-1}$, which indicates an isocyanate group, was eliminated. Thus, a urethane acrylate (X-2) having a refractive index of 1.534 and a weight-average molecular weight (Mw) of 4000 was obtained.

Example 1

Blend of Radical Polymerizable Composition

A radical polymerizable composition was obtained by mixing 18 parts by mass of the ortho-phenylbenzyl acrylate produced in Production Example 1, 82 parts by mass of the para-phenylbenzyl acrylate produced in Production Example 3, 60 parts by mass of the urethane(meth)acrylate (X-1) produced in Production Example 4, and 6 parts by mass of a photopolymerization initiator ("IRGACURE-184" manufactured by Ciba Specialty Chemicals).

Production of Cured Film

The obtained radical polymerizable composition was applied onto a chrome-plated metal sheet. A transparent PET film having an untreated surface was placed on the resultant composition layer, and the thickness of the composition layer was adjusted to 50 μm. The composition layer was cured by being irradiated with an ultraviolet ray having 500 mJ/cm$^2$ using a high-pressure mercury lamp from the transparent substrate side. Thus, a layered body was obtained. A cured layer of the radical polymerizable composition was removed from the metal sheet and transparent substrate of the layered body to obtain a cured film.

Cured Film with Substrate

A layered body was obtained through the same process as that of the production of the cured film, except that the substrate was changed to a transparent PET film whose surface was treated so as to have adhesiveness. Only the metal sheet was removed from the layered body to obtain a cured film with a substrate.

Evaluations

Various evaluations below were conducted for the radical polymerizable composition, the cured film, and the cured film with a substrate.

Evaluation 1: Measurement of Refractive Index

The cured film produced in Example 1 was brought into contact with a prism of an Abbe refractometer ("NAR-3T" manufactured by ATAGO CO., LTD.) using 1-bromonaphthalene and the refractive index at 25° C. was measured.

Evaluation 2: Bending Resistance

A test piece having a size of 5 cm×2 cm was prepared from the cured film produced in Example 1. The test piece was bent in the direction in which the long sides extend until the short sides contacted each other, and the presence of fractures was evaluated.
Good: No fractures, cracks, or the like are formed.
Poor: Fractures, cracks, or the like are formed.
Evaluation 3: Cutting Test The cured film with a substrate produced in Example 1 was cut using a precision hand cutter KPS3002 (manufactured by Sankyo) so that an edge of the cutter contacted the cured film from the resin layer side. An evaluation of "Good" was given when the cured resin layer or substrate did not receive any damage. An evaluation of "Poor" was given when chipping or fractures were caused.

Examples 2 to 11

A radical polymerizable composition, a cured film, and a cured film with a substrate were produced in the same manner as in Example 1, except that the mixing ratio listed in Table 1 or 2 was employed. Then, the above-described evaluations were conducted. Tables 1 and 2 show the evaluation results.

TABLE 1

| Compound | Example 1 | Example 2 | Example 3 | Example 4 | Example 5 |
|---|---|---|---|---|---|
| Ortho-phenylbenzyl acrylate (Production Example 1) [part by mass] | 18 | 18 | 50 | | 18 |
| Meta-phenylbenzyl acrylate (Production Example 2) [part by mass] | | | | 18 | |
| Para-phenylbenzyl acrylate (Production Example 3) [part by mass] | 82 | 82 | 50 | 82 | 82 |
| 4,4'-bis(acryloylmethyl)biphenyl (Production Example 4) [part by mass] | | | | | |
| Biphenyl compound (Production Example 5) [part by mass] | | | | | |
| Mixture (1) (Production Example 6) [part by mass] | | | | | |
| Urethane (meth)acrylate (X-1) (Production Example 7) [part by mass] | 60 | 80 | 60 | 60 | |
| Urethane (meth)acrylate (X-2) (Production Example 8) [part by mass] | | | | | 60 |
| Initiator [part by mass] | 6 | 7 | 6 | 6 | 6 |
| Viscosity (mPa·s) | 3000 | 5000 | 3000 | 3000 | 3000 |
| Liquid refractive index | 1.5876 | 1.5870 | 1.5876 | 1.5879 | 1.5696 |
| Refractive index of cured product | 1.6126 | 1.6070 | 1.6126 | 1.6129 | 1.5946 |
| Bending test | Good | Good | Good | Good | Good |
| Cutting test | Good | Good | Good | Good | Good |

TABLE 2

| Compound | Example 6 | Example 7 | Example 8 | Example 9 | Example 10 | Example 11 |
|---|---|---|---|---|---|---|
| Ortho-phenylbenzyl acrylate (Production Example 1) [part by mass] | | | 40 | 80 | 40 | |
| Meta-phenylbenzyl acrylate (Production Example 2) [part by mass] | | | | | | |
| Para-phenylbenzyl acrylate (Production Example 3) [part by mass] | | | | | 40 | |
| 4,4'-bis(acryloylmethyl)biphenyl (Production Example 4) [part by mass] | | | 60 | | | |
| Biphenyl compound (Production Example 5) [part by mass] | | | | 20 | 20 | |
| Mixture (1) (Production Example 6) [part by mass] | 100 | 100 | | | | 100 |
| Urethane (meth)acrylate (X-1) (Production Example 7) [part by mass] | 60 | 80 | 60 | 60 | 60 | |
| Urethane (meth)acrylate (X-2) (Production Example 8) [part by mass] | | | | | | 60 |
| Initiator [part by mass] | 6 | 7 | 6 | 6 | 6 | 6 |
| Viscosity (mPa·s) | 3000 | 5000 | 3500 | 4000 | 4000 | 3000 |
| Liquid refractive index | 1.5881 | 1.5874 | 1.5745 | 1.5820 | 1.5889 | 1.5701 |
| Refractive index of cured product | 1.6120 | 1.6090 | 1.5970 | 1.6040 | 1.6100 | 1.5950 |
| Bending test | Good | Good | Good | Good | Good | Good |
| Cutting test | Good | Good | Good | Good | Good | Good |

Comparative Examples 1 and 2

A radical polymerizable composition, a cured film, and a cured film with a substrate were produced in the same manner as in Example 1, except that the mixing ratio listed in Table 3 was employed. Then, the above-described evaluations were conducted. Table 3 shows the evaluation results. The resin composition produced in Comparative Example 2 had an extremely high viscosity and therefore the viscosity and liquid refractive index could not be measured. Furthermore, the application of the resin composition was impossible and thus the evaluation of each film was also impossible.

TABLE 3

| Compound | Comparative Example 1 | Comparative Example 2 |
|---|---|---|
| Urethane (meth)acrylate (X-1) (Production Example 7) [part by mass] | | 60 |
| Fluorene | 60 | 100 |
| OPPEA | 100 | |
| Initiator | 6 | 6 |
| Viscosity | 3000 | could not be measured |
| Liquid refractive index | 1.5887 | could not be measured |
| Refractive index of cured product | 1.6130 | could not be applied |
| Bending test | Poor | could not be applied |
| Cutting test | Poor | could not be applied |

Footnote of Table 2

Fluorene (9,9-bis[4-(2-acryloyloxyethoxy)phenyl]fluorene): "A-BPEF" manufactured by Shin Nakamura Chemical Co., Ltd. OPPEA (ortho-phenylphenoxyethyl acrylate): "Miramer M1142" manufactured by Miwon Specialty Chemical Co., Ltd.

The invention claimed is:

1. A radical polymerizable composition comprising:
phenylbenzyl(meth)acrylate (A),
a urethane(meth)acrylate (X) having an aromatic ring in its molecular structure,
a radical polymerization initiator (Y), and
bis[(meth)acryloylmethyl]biphenyl (B) or a biphenyl compound (C) having a molecular structure in which biphenyl structures are bonded to each other only through a methylene
as essential components.

2. The radical polymerizable composition according to claim 1, wherein the phenylbenzyl(meth)acrylate (A) includes ortho-phenylbenzyl(meth)acrylate and para-phenylbenzyl(meth)acrylate at a molar ratio [[ortho-phenylbenzyl(meth)acrylate]/[para-phenylbenzyl(meth)acrylate]] of 55/45 to 10/90.

3. The radical polymerizable composition according to claim 1, wherein a content of the urethane(meth)acrylate (X) is 50 to 100 parts by mass relative to 100 parts by mass of the phenylbenzyl(meth)acrylate (A).

4. The radical polymerizable composition according to claim 1, wherein the urethane(meth)acrylate (X) is a urethane(meth)acrylate having a bis(phenylene)alkane skeleton in its molecular structure.

5. The radical polymerizable composition according to claim 1, wherein the urethane(meth)acrylate (X) has a weight-average molecular weight (Mw) of 350 to 5000.

6. The radical polymerizable composition according to claim 1, wherein a content of the phenylbenzyl(meth)acrylate (A) is 30 to 95 parts by mass relative to 100 parts by mass in total of the phenylbenzyl(meth)acrylate (A), the bis[(meth)acryloylmethyl]biphenyl (B), and the biphenyl compound (C) having a molecular structure in which biphenyl structures are bonded to each other only through a methylene.

7. The radical polymerizable composition according to claim 1, wherein a content of the urethane(meth)acrylate (X) is 50 to 100 parts by mass relative to 100 parts by mass in total of the phenylbenzyl(meth)acrylate (A), the bis[(meth)acryloylmethyl]biphenyl (B), and the biphenyl compound (C) having a molecular structure in which biphenyl structures are bonded to each other only through a methylene.

8. A cured product obtained by curing the radical polymerizable composition according to claim 1.

9. A plastic lens obtained by curing the radical polymerizable composition according to claim 1.

10. A cured product obtained by curing the radical polymerizable composition according to claim 2.

11. A cured product obtained by curing the radical polymerizable composition according to claim 3.

12. A plastic lens obtained by curing the radical polymerizable composition according to claim 2.

13. A plastic lens obtained by curing the radical polymerizable composition according to claim 3.

* * * * *